Patented Aug. 14, 1934

1,970,388

UNITED STATES PATENT OFFICE 1,970,388

TRANSPARENT FILM AND PROCESS OF MAKING THE SAME

Theodore Fritz Menzel, New York, N. Y.

No Drawing. Application June 8, 1931,
Serial No. 543,019

9 Claims. (Cl. 18—57)

This invention relates to the manufacture of thin, flexible films or coatings for use in encasing, sealing or protecting articles or packages.

The main object of the invention is to provide a composition which may be formed into thin sheets for use as wrapping or encasing material, or which may be sprayed or otherwise applied as a liquid in order to form the protecting film directly upon the article or package.

A further object of the invention is to provide a composition suitable for this purpose and which may be easily and inexpensively treated so as to render the same waterproof.

Other objects and advantages will be pointed out hereinafter or will be apparent from a consideration of the process and composition involved.

Merely as one example of my improved composition and process, the invention may be carried out as follows. One portion by weight of dry gelatin is dissolved in approximately seven parts by weight of water at suitable temperature. This temperature should be sufficiently high to bring about a rapid solution or formation of a mass of uniform density, and should not be so high as to effect deleterious chemical change in the gelatin. Approximately 68° F. is a suitable temperature, although the temperature may vary between 50° F. and 150° F. The solution may be filtered in case there is any undissolved portion or any solid impurity, and is then heated to approximately 120° F. to 125° F., preferably over a water bath.

To this solution glycerin is added and the product is thoroughly mixed. The percentage of glycerin is preferably between 25% and 50%. The glycerin acts as a softening agent and renders the final product softer and more flexible, as well as adding to the tensile strength. The percentage of glycerin may be varied, inasmuch as the larger the amount used the longer is the time required for final drying. In place of the glycerin I may employ castor oil as the softening agent.

After the addition and mixing of the glycerin there is added a small amount of formic acid in a water solution, and at a temperature of approximately 100° F. The amount of formic acid added is preferably approximately 1%.

In order to neutralize or destroy any slight odor that the gelatin may have, particularly if it is not a pure product, there is preferably added about 1¼% of oil of peppermint dissolved in water at 110° F. to 115° F.

In case the gelatin is not of a specially pure and transparent character, there is preferably added about 1½% of a 1% blue color solution made from indigo or other water soluble dye.

All of the percentages mentioned are in respect to the amount of gelatin employed.

The mass is then thoroughly mixed for about ten minutes and thereafter there are added 1½ portions of glucose which may have been made from corn sugar, and which is soluble in water. The mass is further mixed and the mixture should then have a viscosity of 15% to 28% on a glue viscosimeter at a temperature 110° F. The viscosity will vary according to the amount of water present and should be between 15% and 22% if the material is to be sprayed or otherwise directly applied to the article, package or the like to be protected. If the material is to be formed into a sheet or film for wrapping or other encasing purposes, it should have a viscosity of between 20% and 25%.

This material may be directly applied to the articles or packages to be protected by spraying the solution on to the article or package and permitting it to dry thereon, or by dipping the article or package into the solution and quickly removing the same and drying.

If the material is to be formed into sheets or films for later use, the solution may be spread out and dried in thin layers by any suitable form of apparatus, but I preferably employ an apparatus in which the solution is delivered through a measuring aperture on to a traveling steel belt, the character of the delivery apparatus being such as to avoid the formation of any air bubbles. The portion of the belt to which the material is delivered is preferably cooled to a temperature at or slightly below 50° F., and as the belt travels its temperature is increased until at the delivery end it may be between 80° F. and 85° F. The belt may be an endless one of possibly 500 feet in length, and of any suitable width, depending upon the width of the sheets to be formed. The belt is preferably treated with a 1% to 3% ox gall solution to prevent the film from adhering directly to the belt.

During the travel of the belt, and due in part to the heating action, the water and other volatile ingredients will in the main be evaporated, and the sheet may be delivered from the belt as a dry, flexible, thin elastic film. The drying may be facilitated by air circulation if desired. The film is then ready for use for wrapping or other purposes where it is not required that the film be waterproof. If waterproofing is necessary or desired, the sheet is then treated to render it waterproof. This waterproofing may be accomplished by passing the sheet through a 15 formaldehyde bath, or by passing it through a chamber containing trioxymethylene gas. This gas may be made from 3% of solid trioxymethylene dissolved in water and heated in order to gasify the same.

In order to render the film or sheet waterproof, I may coat it with a zaponlac solution which may be applied by running the sheet through a bath of the solution, or by spraying the zaponlac solution on to the sheet, or in any other suitable manner, so that any pores are filled and the entire surface is coated. The zaponlac bath may be made of 3% nitrocellulose in solution in 92% of ether and 5% butyl acetate. The bath may be thinned by a solution of 80% ether, 10% water-free benzol, and 10% butyl acetate.

After coating the sheet with the zaponlac, it may be dried for ten minutes at a temperature of between 80° F. and 100° F., then cooled between steel rollers, and wound on a drum. The sheet, or the solution from which it is formed, may have added thereto any suitable dye if it is desired to obtain a colored sheet, and instead of spraying it or applying it as a thin layer, it may be applied to an open mesh fabric such as wire screening, so as to form an imperforate sheet reinforced and strengthened by the fibers or stands of the fabric.

Where the material is to be sprayed on packages, cartons or the like, and where rapid drying is desirable, and where a high degree of flexibility is not particularly important, the percentage of glycerin may be as low as 5%.

Where the solution is dried on an article, package or the like, it may then be treated in the same manner as the film alone to render it waterproof, that is, the article or package with the dried coating thereon may be sprayed with a formaldehyde solution or dipped in it, or subjected to the action of trioxymethylene gas, or coated with zaponlac.

The amount of oil of peppermint or other deodorant, and the amount of blue color solution, may be reduced or even entirely omitted if the gelatin is of a very high quality as to transparency and odor. If the gelatin be of a yellowish color, or if it has a more pronounced odor, the percentage of the deodorant and blue dye may be increased. Obviously the blue dye is not required if colorless transparency is not desired, as for instance when other dyes are employed to give a distinctive color.

In the foregoing description as to relative proportions of the ingredients, the dry gelatin is assumed to be of such a character that it has approximately 11% of water content.

Having thus described my invention what I claim as new and desire to secure by Letters Patent is:

1. A thin, flexible film containing gelatin, glycerin, formic acid and glucose.

2. A thin, flexible film containing approximately 1 part of gelatin and 1½ parts of glucose, and smaller parts of glycerin and formic acid.

3. The process of making a thin flexible layer for protecting purposes including dissolving gelatin, glucose, glycerin and formic acid in water to make a mixture having a viscosity of 15% to 28% on a glue viscosimeter at a temperature of 110° F., continuously forming a thin layer of the solution on a traveling belt, evaporating the water therefrom, and removing the film from the belt.

4. The process of forming a thin, flexible film, which includes applying a solution of water, gelatin, glycerin, formic acid and glucose to a supporting surface, evaporating the water therefrom and thereafter treating the film to render it waterproof.

5. The process of forming a thin, flexible film, which includes applying a solution of gelatin, glycerin, formic acid and glucose to a supporting surface, evaporating the solvent therefrom, and treating the film with trioxymethylene gas.

6. The process of forming a thin, flexible film, which includes applying a solution of gelatin, glycerin, formic acid and glucose to a supporting surface, evaporating the solvent therefrom, and applying a coating of waterproofing material.

7. The process of coating an article to render the same waterproof, including spraying thereon a solution containing gelatin, glucose, formic acid and glycerin, drying the article to evaporate the solvent, and subjecting the coated article to the action of trioxymethylene gas.

8. An article of manufacture having thereon a thin, flexible surface transparent coating including gelatin, glucose and formic acid.

9. An article of manufacture having thereon a thin, flexible surface transparent coating including gelatin, glucose, formic acid and glycerin.

THEODORE FRITZ MENZEL.